Nov. 4, 1969   R. C. WILLIAMS   3,475,840
PARALLELOGRAM DRAFT ASSEMBLY FOR SCRAPER
Filed June 1, 1967   2 Sheets-Sheet 1
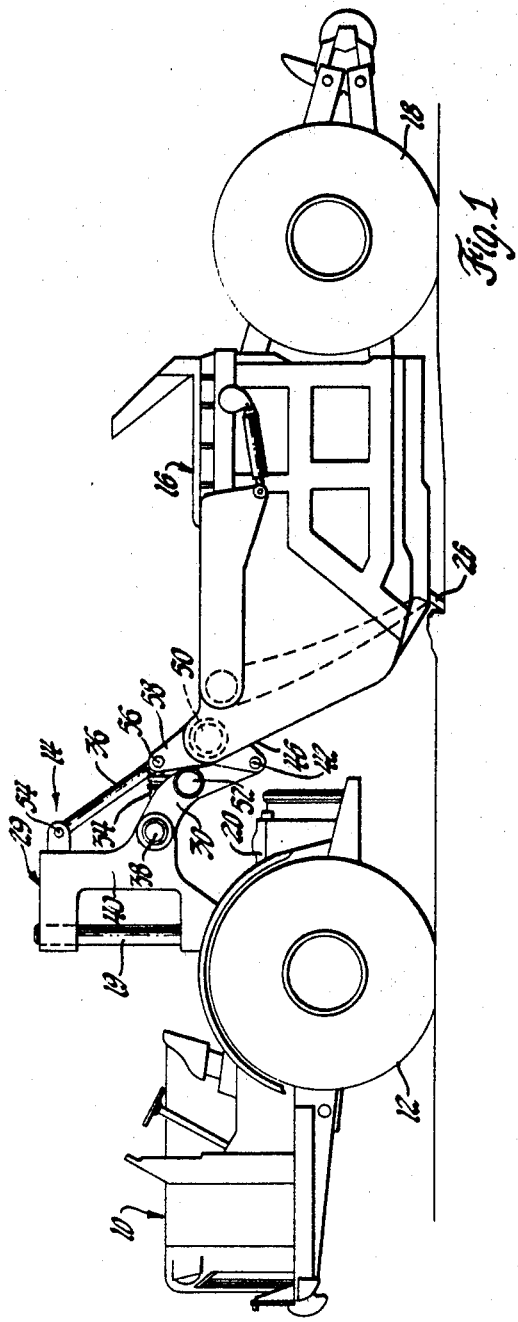
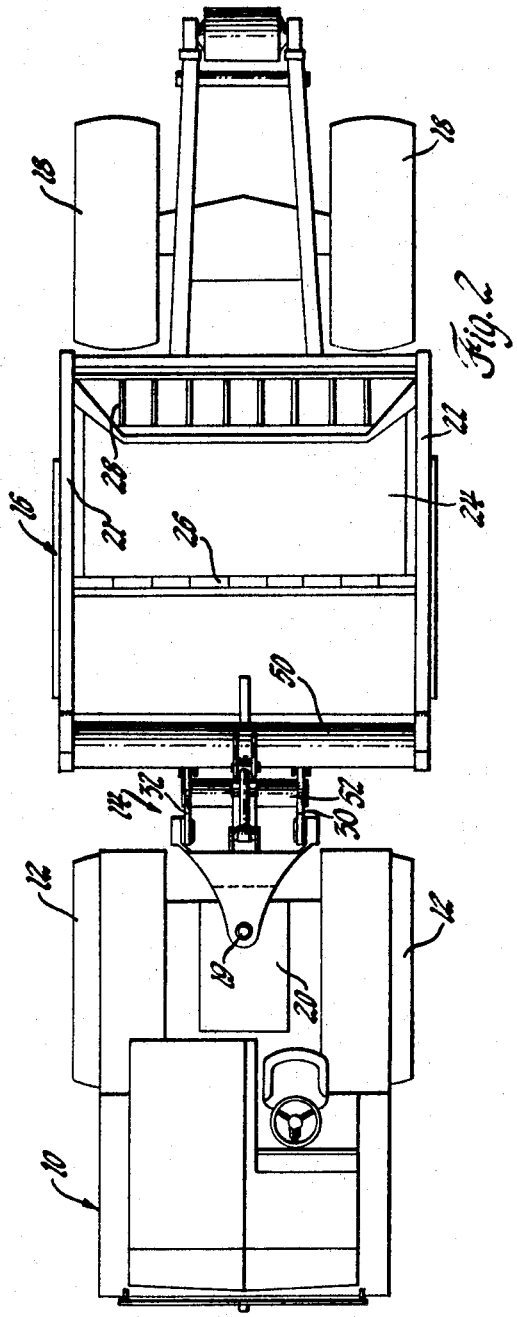
INVENTOR.
Russell C. Williams
BY
E. J. Bishop
ATTORNEY

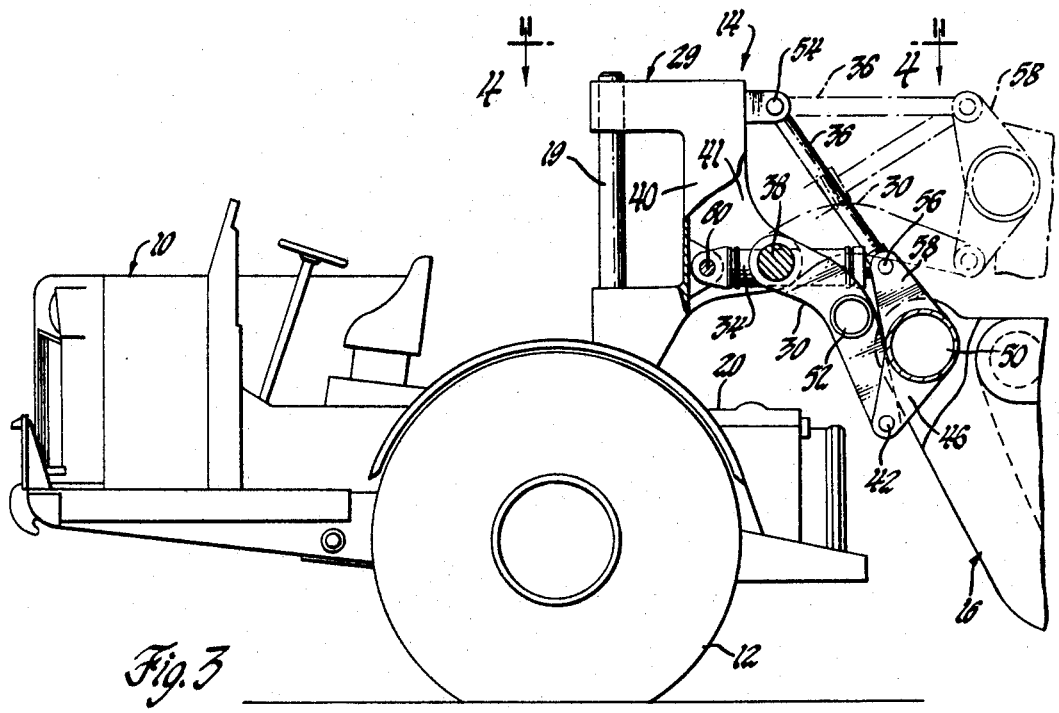
Fig. 3
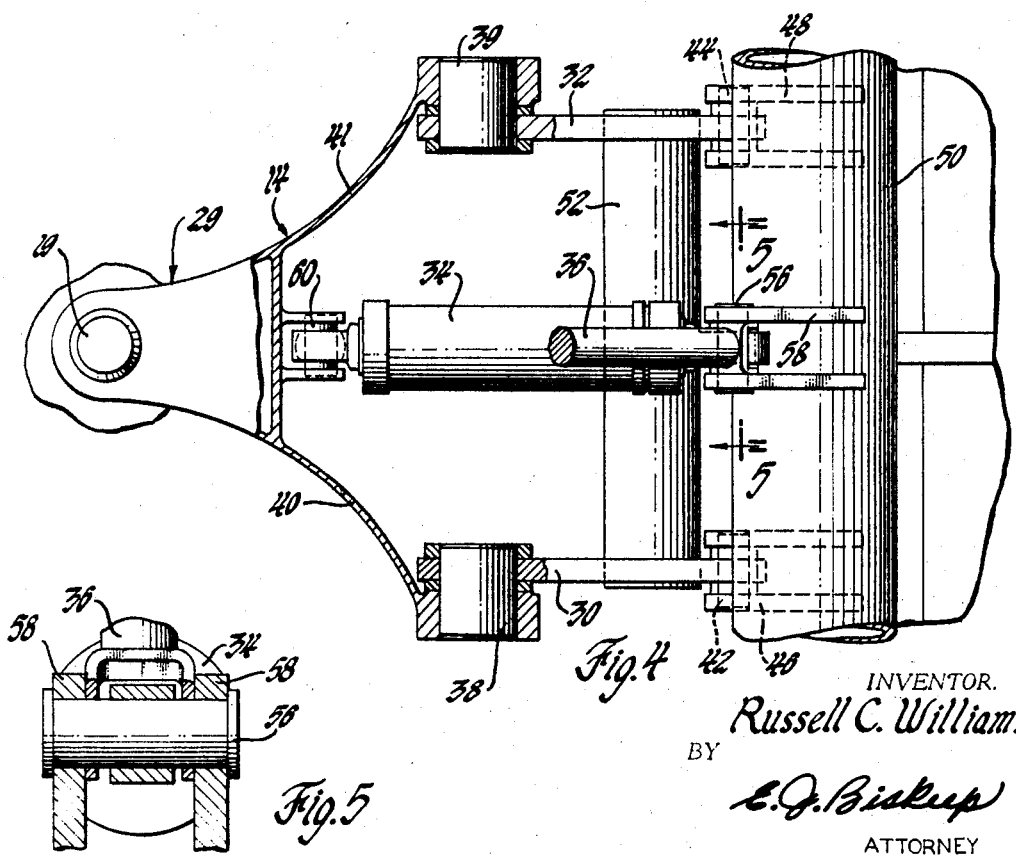
Fig. 4
Fig. 5
INVENTOR.
Russell C. Williams
BY
ATTORNEY United States Patent Office 3,475,840
Patented Nov. 4, 1969

3,475,840
PARALLELOGRAM DRAFT ASSEMBLY
FOR SCRAPER
Russell C. Williams, Rocky River, Ohio, assignor to
General Motors Corporation, Detroit, Mich., a
corporation of Delaware
Filed June 1, 1967, Ser. No. 642,860
Int. Cl. E02f 3/85
U.S. Cl. 37—129
6 Claims

ABSTRACT OF THE DISCLOSURE

A scraper in which the tractor is connected to the trailing bowl by a parallelogram linkage which supports the bowl for movement about a transverse horizontal axis between a raised-carry position and a lowered-dig position.

---

The present trend in scraper design is towards increased load capacity for the bowl in order to realize more efficient earth-moving operations. Thus, scrapers having bowls which carry 30 or more cubic yards are becoming quite common, with larger bowls capable of increased payloads being proposed. As a result, the outside dimensions of the bowl are becoming so large that when associated with the pull arms which normally straddle the outside walls of the bowl, maximum width shipping dimensions set by law and affecting the various carriers are being exceeded. In order to cope with this problem, equipment manufacturers have had to improvise the scraper design by making the pull arms removable from the torque tube so that the tractor and bowl can be accommodated by transporters, such as railway and highway flatcars. It should be apparent, however, that this solution necessarily increases the cost of manufacture of the scraper and also entails increased labor costs at the points of shipment and final destination due to the requirement for the disassembly and reassembly of the scraper.

Accordingly, the objects of the present invention are to provide a scraper bowl draft assembly that has all parts thereof located within the outer dimensions of the bowl side walls; to provide a parallelogram linkage including a fluid-operated actuator for connecting a tractor to a scraper bowl and for moving the bowl between a raised-carry position and a lowered-dig position; to provide a draft assembly of limited width for connecting a tractor to a scraper bowl; and to provide a draft assembly for a scraper that permits the latter to be shipped as a unit without requiring disassembly even in cases where the bowl width dimensions are the same as the shipping dimensions established by the carrier.

Other objects and advantages of the present invention will be more apparent from the following detailed description when taken with the drawings in which:

FIGURE 1 is a side elevational view of the selfpropelled scraper incorporating a draft assembly made in accordance with this invention;

FIGURE 2 is a plan view of the scraper of FIGURE 1;

FIGURE 3 is an enlarged elevational view taken on line 3–3 of FIGURE 1 and showing the forward end of a scraper including the draft frame made in accordance with this invention;

FIGURE 4 is an enlarged fragmentary view taken on line 4–4 of FIGURE 3, and

FIGURE 5 is an enlarged view taken on line 5–5 of FIGURE 4.

Referring now to the drawings and more particularly FIGURES 1 and 2 thereof, a scraper is shown comprising an overhung tractor 10 having ground-engaging wheels 12 which are suitably powered by an engine carried by the tractor. A draft assembly 14 connects the tractor 10 with a trailing bowl 16 which also is provided with ground-engaging wheels 18. The draft assembly 14 is pivotally supported by a king pin 19 secured to a platform 20 which, in turn, can be carried by the tractor for oscillatory movement about a longitudinal axis thereby permgintit permitting the scraper to traverse irregular terrain in the usual manner. As is conventional, the king pin 19 defines a vertical steer axis about which the tractor 10 is adapted to be relatively articulated to one side or the other of a straightahead position through a suitable steer mechanism such as that shown in Fryer 3,292,724 which is assigned to the assignee of this invention.

The bowl 16 includes the usual material retaining portion comprising a pair of laterally spaced side walls 21 and 22 interconnected at the lower ends thereof by a floor 24. Adjacent the forward edge of the floor 24 is a transversely extending cutting blade 26, the opposite ends of which are secured to the side walls. An upstanding ejector 28 is provided which serves as a backwall and is adapted to be moved forwardly toward the blade 26 for ejecting a load in the conventional manner.

As best seen in FIGURES 3 and 4, the draft assembly 14 includes a frame 29 and a parallelogram linkage comprising a pair of laterally spaced support arms 30 and 32, a double-acting hydraulic jack 34, and a link 36. The respective support arms 30 and 32 are pivotally secured at their forward ends by axially aligned pivotal connections 38 and 39 to rearwardly diverging arms 40 and 41 formed with the frame 29. The opposite ends of the support arms 30 and 32 extend rearwardly for pivotal connection at axially aligned points 42 and 44 with downwardly projecting bracket members 46 and 48 which are rigidly secured to a tubular structural member 50 which, in turn, is supported by the side walls of the bowl 16 for rotation about a transverse horizontal axis. In order to assure that the support arms 30 and 32 are synchronized in movement, a cross member 52 is provided which interconnects intermediate portions of the support arms as seen in FIGURE 4.

The link 36 has one end pivotally connected to the frame 29 by a pivotal connection 54 which is located vertically above and between the pivotal connections 38 and 39 of the support arms. The other or rearward end of the link 36 is connected by a pivotal connection 56 to an upstanding bracket member 58 rigidly fixed to the upper mid-section of the structural member 50 and is similarly located with respect to the associated rearward pivotal connections 42 and 44 of the support arms. Thus, the basic parallelogram linkage is formed which permits the bowl 16 to be moved between a lowered-dig position, as shown in full lines in FIGURE 1, and a raised-carry position illustrated by the phantom lines in FIGURE 3. Such movement is realized through the hydraulic jack 34 which has the cylinder end thereof connected to the frame 29 by a pivotal connection 60, while the rod end is connected to the bowl 16 at a point common with the pivotal connection 56 as viewed in FIGURE 5. Thus, expansion of the jack 34 results in a raising of the bowl, while contraction places the bowl 16 in the lowered-dig position.

As aforementioned and as best seen in FIGURE 2, this draft assembly is located entirely within the outer side dimensions of the bowl 16 thereby permitting the latter to assume maximum width and, accordingly, increased payload without requiring lengthening of the bowl. Thus, in those cases where the carrier is of sufficient length to accommodate the entire scraper, the latter need not be disassembled during shipment.

Various changes and modifications can be made in this construction without departing from the spirit of the invention. Such changes and modifications are contemplated by the inventor and he does not wish to be limited except by the scope of the appended claims.

What is claimed is:

1. A scraper including a tractor and a trailing bowl, said bowl comprising a pair of laterally spaced side walls, a cutting blade extending between the lower end of said side walls adjacent the forward end of the bowl, a draft assembly connecting the tractor to the bowl for relative articulation therebetween about a vertical steer axis, said draft assembly including a frame and a parallelogram linkage for supporting the bowl for movement about a transverse horizontal axis between a raised-carry position and a lowered-dig position, said linkage comprising support arm means having one end thereof connected to said frame by a first pivotal connection, the other end of said support arm means connected to said bowl by a second pivotal connection, a link having the opposite ends thereof respectively connected to said frame and said bowl by third and fourth pivotal connections, and a double-acting hydraulic jack having relatively movable piston and cylinder members for moving said bowl between said aforementioned positions, one of said jack members connected to said frame by a fifth pivotal connection substantially horizontally aligned with the first pivotal connection and located forwardly thereof while the other of said jack members is connected to said bowl by said fourth pivotal connection.

2. The scraper of claim 1 wherein said first, fourth, and fifth pivotal connections are located substantially in a common plane when the bowl is in the lowered-dig position.

3. The scraper of claim 1 wherein said first, second, and fifth pivotal connections are located substantially in a common plane vertically spaced from and parallel to a line connecting the centers of the third and fourth pivotal connections when the bowl is in the raised-carry position.

4. The scraper of claim 1 wherein the longitudinal axes of said link and said jack are substantially located in a common vertical plane.

5. The scraper of claim 4 wherein said support arm means comprises a pair of laterally spaced arms, and said common vertical plane is located substantially midway between said arms.

6. The scraper of claim 1 wherein the forward end of said bowl supports a member for rotation about a transverse horizontal axis, and said second and fourth pivotal connections are located at fixed points thereon.

References Cited

UNITED STATES PATENTS

| | | | |
|---|---|---|---|
| 2,107,120 | 2/1938 | Yount | 37—126 |
| 2,804,702 | 9/1957 | Corser et al. | 37—126 |
| 3,073,045 | 1/1963 | Kelley | 37—129 |
| 3,195,248 | 7/1965 | Martin | 37—4 XR |

EDGAR S. BURR, Primary Examiner

PO-1050
(5/69)

UNITED STATES PATENT OFFICE
CERTIFICATE OF CORRECTION

Patent No. 3,475,840          Dated November 4, 1969

Inventor(s) Russell C. Williams

It is certified that error appears in the above-identified patent and that said Letters Patent are hereby corrected as shown below:

Column 2, line 6, cancel "permgintit"; line 35, "bowl 16 for" should read -- bowl 16 for torsional --.

SIGNED AND
SEALED
FEB 17 1970

(SEAL)
Attest:

Edward M. Fletcher, Jr.
Attesting Officer

WILLIAM E. SCHUYLER, JR.
Commissioner of Patents